United States Patent
Egami et al.

(10) Patent No.: US 11,889,820 B2
(45) Date of Patent: Feb. 6, 2024

(54) POSITION INFORMATION TRANSMISSION DEVICE, POSITION INFORMATION TRANSMISSION METHOD, AND PROGRAM

(71) Applicant: Sharp NEC Display Solutions, Ltd., Tokyo (JP)

(72) Inventors: Takuto Egami, Tokyo (JP); Shinya Ueda, Tokyo (JP)

(73) Assignee: SHARP NEC DISPLAY SOLUTIONS, LTD., Tokyo (JP)

(*) Notice: Subject to any disclaimer, the term of this patent is extended or adjusted under 35 U.S.C. 154(b) by 60 days.

(21) Appl. No.: 17/641,393

(22) PCT Filed: Sep. 11, 2019

(86) PCT No.: PCT/JP2019/035657
§ 371 (c)(1),
(2) Date: Mar. 8, 2022

(87) PCT Pub. No.: WO2021/048945
PCT Pub. Date: Mar. 18, 2021

(65) Prior Publication Data
US 2022/0322641 A1    Oct. 13, 2022

(51) Int. Cl.
*A01K 29/00*    (2006.01)
*A01K 11/00*    (2006.01)
(Continued)

(52) U.S. Cl.
CPC .......... *A01K 29/005* (2013.01); *A01K 11/008* (2013.01); *G01S 19/05* (2013.01); *G01S 19/14* (2013.01); *G08B 21/18* (2013.01)

(58) Field of Classification Search
CPC ..... A01K 29/005; A01K 11/008; G01S 19/05; G01S 19/14; G01S 19/35; G08B 21/18; H04W 4/021; H04W 4/023; H04W 4/029
(Continued)

(56) References Cited

U.S. PATENT DOCUMENTS 10,440,936 B2 * 10/2019 Yajima ................ G06F 16/58
2008/0128486 A1    6/2008 Lowe
(Continued)

FOREIGN PATENT DOCUMENTS

JP    H10-295212 A    11/1998
JP    H1025212    * 11/1998
(Continued)

OTHER PUBLICATIONS

International Search Report (ISR) (PCT Form PCT/ISA/210), in PCT/JP2019/035657, dated Dec. 3, 2019.

*Primary Examiner* — Omar Casillashernandez
(74) *Attorney, Agent, or Firm* — MCGINN I.P. LAW GROUP, PLLC

(57) ABSTRACT

A communication device is attached to an animal in a facility, for example, using a band. The communication device transmits at least a position of the communication device (hereinafter referred to as position information) and identification information of the communication device (hereinafter referred to as a communication device ID) to a position information transmission device. The position information transmission device uses the position information and the identification information received from the communication device to select an animal whose position information is to be delivered. The position information transmission device transmits the position information about the selected animal to at least one of an in-zoo display device, a user terminal, and a staff member terminal.

11 Claims, 18 Drawing Sheets

(51) Int. Cl.
    *G01S 19/05* (2010.01)
    *G01S 19/14* (2010.01)
    *G08B 21/18* (2006.01)

(58) Field of Classification Search
    USPC .................................................. 340/539.12
    See application file for complete search history.

(56) References Cited

U.S. PATENT DOCUMENTS

| | | | |
|---|---|---|---|
| 2018/0228129 A1 | 8/2018 | Yajima et al. | |
| 2023/0086838 A1* | 3/2023 | Keating | G05B 15/02 |

FOREIGN PATENT DOCUMENTS

| | | | |
|---|---|---|---|
| JP | 2010-010815 A | | 1/2010 |
| JP | 2011-244736 A | | 12/2011 |
| JP | 2011244736 | * | 12/2011 |
| JP | 2012-200166 A | | 10/2012 |
| JP | 2012200166 | * | 10/2022 |
| WO | WO 2017/033394 A1 | | 3/2017 |
| WO | WO 2018/100877 A1 | | 6/2018 |

* cited by examiner

| COMMUNICATION DEVICE ID | SENSING INFORMATION (POSITION INFORMATION) | ABNORMALITY INFORMATION |
|---|---|---|
| ..... | ..... | — |
| ..... | ..... | — |
| ..... | ..... | DETACHMENT |
| ..... | ..... | FAILURE OF SENSOR |

| ANIMAL NAME/ INDIVIDUAL NAME | OPEN SCHEDULE |
|---|---|
| ..... | 10:00−18:00 |
| ..... | 9:00−12:00 15:00−18:00 |
| ..... | ..... |

| COMMUNICATION DEVICE ID | ANIMAL IDENTIFICATION INFORMATION | INDIVIDUAL NAME OF ANIMAL | CURRENT POSITION |
|---|---|---|---|
| ..... | JAPANESE MACAQUE | ..... | EXHIBITION AREA |
| ..... | JAPANESE MACAQUE | ..... | IN ZOO |
| ..... | JAPANESE MACAQUE | ..... | RENTAL |
| ..... | TIGER | ..... | ABSENCE |
| ..... | ..... | ..... | ..... |

| MAP NAME (ANIMAL IDENTIFICATION INFORMATION) | MAP DATA | CURRENT POSITION |
|---|---|---|
| ALL | ..... | — |
| PANDA | ..... | ..... |
| JAPANESE MACAQUE | ..... | ..... ..... ..... |
| ..... | ..... | ..... |

260

FIG. 12
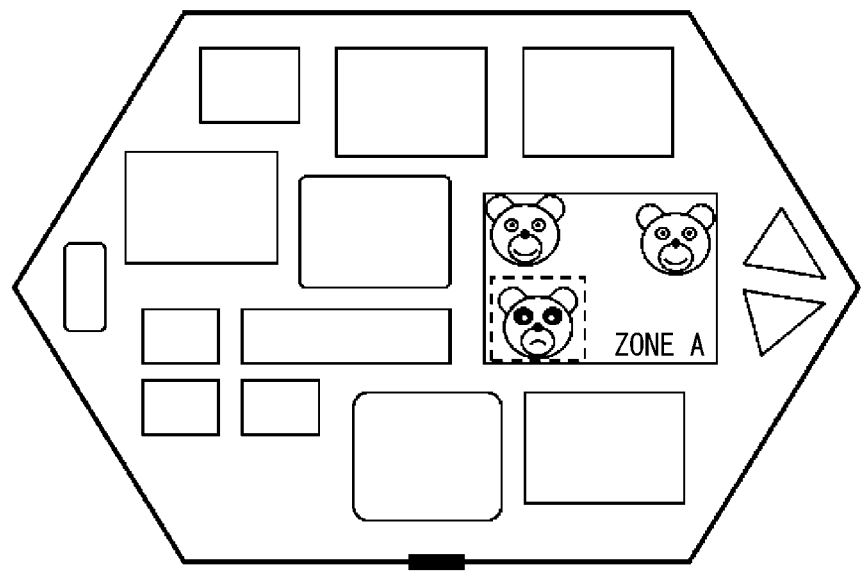
(A)
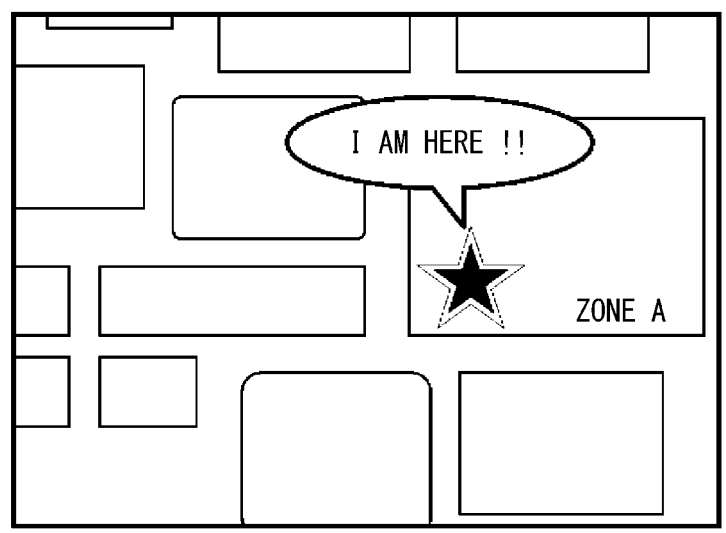
(B)

| ID | CURRENT POSITION | ABNORMALITY INFORMATION | STATE INFORMATION |
|---|---|---|---|
| ..... | ..... | — | ..... |
| ..... | ..... | — | ..... |
| ..... | ..... | DETACHMENT | ..... |
| ..... | ..... | FAILURE OF SENSOR | ..... |

| DEVICE ID | ANIMAL IDENTIFICATION INFORMATION | INDIVIDUAL NAME OF ANIMAL | CURRENT POSITION | ACTIVITY STATE |
|---|---|---|---|---|
| ..... | JAPANESE MACAQUE | ..... | EXHIBITION AREA | ACTING |
| ..... | JAPANESE MACAQUE | ..... | IN ZOO | SLEEPING |
| ..... | JAPANESE MACAQUE | ..... | RENTAL | ..... |
| ..... | TIGER | ..... | ABSENCE | ..... |
| ..... | ..... | ..... | ..... | ..... |

| FACILITY NAME (ANIMAL IDENTIFICATION INFORMATION) | IMAGING DEVICE ID | DISTANCE SENSOR ID | IMAGE | DISTANCE |
|---|---|---|---|---|
| PANDA | ..... | ..... | ..... | ..... |
| JAPANESE MACAQUE | ..... | ..... | ..... | ..... |
| ..... | ..... | ..... | ..... | ..... |

| ANIMAL NAME | FEATURE QUANTITY |
|---|---|
| PANDA | ..... |
| JAPANESE MACAQUE | ..... |
| ..... | ..... |

POSITION INFORMATION TRANSMISSION DEVICE, POSITION INFORMATION TRANSMISSION METHOD, AND PROGRAM

TECHNICAL FIELD

The present invention relates to a position information transmission device, a position information transmission method, and a program.

BACKGROUND ART

As technology for ascertaining a position of an animal in a zoo, for example, there is technology described in Patent Literature 1. In Patent Literature 1, the case where a terminal is attached to an animal within a safari park, a position of the animal is ascertained using a terminal ID transmitted from this terminal, and map information including the position of the animal can be viewed externally is described.

CITATION LIST

Patent Literature

Patent Literature 1

Japanese Unexamined Patent Application, First Publication No. 2010-010815

SUMMARY OF INVENTION

Technical Problem

A visitor to a zoo may desire to see a specific animal. In this case, if the animal is not in a desired state (for example, awake and active) when the visitor has moved to an area of the animal, the visitor's desire will not be satisfied. In order to prevent this dissatisfaction, it is necessary to provide appropriate information to a visitor to a zoo or a person who desires to visit the zoo.

An objective of the present invention is to provide appropriate information to a visitor to a zoo or a person who desires to visit the zoo.

Solution to Problem

According to the present invention, there is provided a position information transmission device including:

an acquirer configured to acquire position information of a communicator or an animal and identification information for identifying the communicator or the animal from the communicator attached to each of a plurality of animals within a facility; and a transmitter configured to transmit the position information to a display with respect to the animal whose position information satisfies a criterion.

According to the present invention, there is provided a position information transmission method including:

acquiring, by a computer, position information of a communicator or an animal and identification information for identifying the communicator or the animal from the communicator attached to each of a plurality of animals within a facility; and transmitting, by the computer, the position information to a display with respect to the animal whose position information satisfies a criterion.

According to the present invention, there is provided a program for causing a computer to have:

a function of acquiring position information of a communicator or an animal and identification information for identifying the communicator or the animal from the communicator attached to each of a plurality of animals within a facility; and a function of transmitting the position information to a display with respect to the animal whose position information satisfies a criterion.

Advantageous Effects of Invention

According to the present invention, it is possible to provide appropriate information to a visitor to a zoo or a person who desires to visit the zoo.

BRIEF DESCRIPTION OF DRAWINGS

The above-described objective and other objectives, features, and advantages will be further clarified using a preferred embodiment to be described below and the accompanying drawings below.

FIG. 4 is a diagram showing an example of information stored in a position storage.

FIG. 5 is a diagram showing an example of information stored in a schedule storage.

FIG. 6 is a diagram showing an example of information stored in an animal information storage.

FIGS. 12(A) and 12(B) are diagrams showing an example of a display screen of an in-zoo display device or a user terminal.

FIG. 17 is a diagram showing an example of a data configuration of a position storage according to the second embodiment.

FIG. 18 is a diagram showing an example of a data configuration of an animal information storage according to the second embodiment.

FIG. 24 is a diagram showing an example of data stored in an image storage.

FIG. 25 is a diagram showing an example of data stored in a feature quantity storage.

DESCRIPTION OF EMBODIMENTS

Hereinafter, an embodiment of the present invention will be described using drawings. In all the drawings, similar constituent elements are denoted by similar reference signs and description thereof will be omitted.

First embodiment

Figure 1:
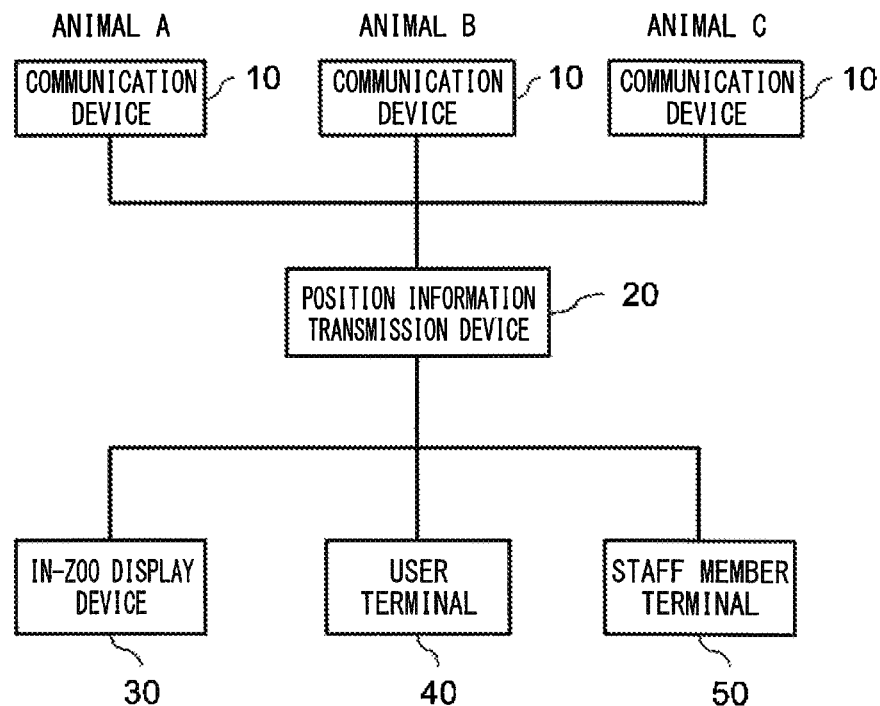
FIG. 1 is a diagram showing an environment in which a position information transmission device according to a first embodiment is used.

FIG. 1 is a diagram showing an environment in which a position information transmission device 20 according to the present embodiment is used. The position information transmission device 20 is used together with a communication device 10, an in-zoo display device 30, a user terminal 40, and a staff member terminal 50. The in-zoo display device 30, the user terminal 40, and the staff member terminal 50 have a display (an example of a display).

The communication device 10 is attached to an animal in a facility, for example, an exhibition facility such as a zoo or an aquarium, using a band. Hereinafter, the facility will be described as a zoo.

There are a plurality of animals in the zoo, but the communication device 10 is attached to at least one of the plurality of animals, preferably all the animals in the zoo. The communication device 10 transmits at least information indicating a position of the communication device 10, i.e., a position of the animal to which the communication device 10 is attached, (hereinafter referred to as position information) and identification information of the communication device 10, i.e., identification information of the animal to which the communication device 10 is attached, (hereinafter referred to as a communication device ID) to the position information transmission device 20.

The position information transmission device 20 selects an animal whose position information is to be delivered using the position information and the identification information received from the communication device 10. The position information transmission device 20 transmits the position information of the selected animal to at least one of the in-zoo display device 30, the user terminal 40, and the staff member terminal 50.

The in-zoo display device 30 is, for example, a fixed display installed in the zoo. The user terminal 40 is a terminal that is operated by a person outside of the zoo or a terminal owned by a visitor. In the latter case, the user terminal 40 may be rented from the zoo or may be a terminal owned by the visitor. The staff member terminal 50 is a terminal viewed by the staff member of the zoo. Both the user terminal 40 and the staff member terminal 50 have a display and perform a display process using the position information transmitted from the position information transmission device 20.

Figure 2:
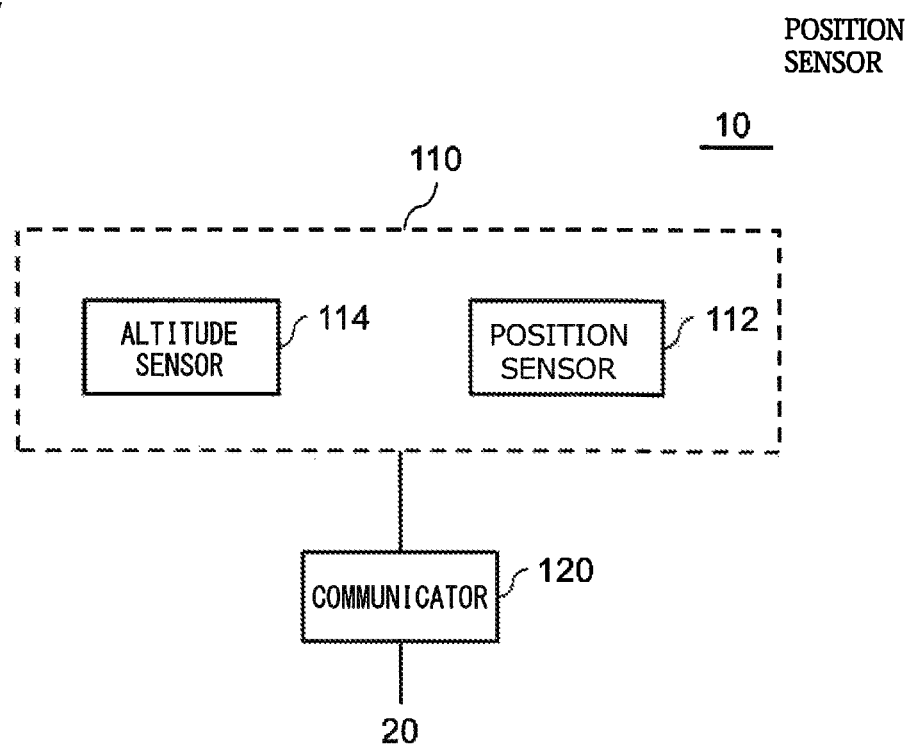
FIG. 2 is a diagram showing an example of a functional configuration of a communication device.

FIG. 2 is a diagram showing an example of a functional configuration of the communication device 10. The communication device 10 includes a sensor group 110 and a communicator 120.

The sensor group 110 has a plurality of sensors. These sensors generate information about the animal to which the communication device 10 is attached. In the example shown in FIG. 2, the sensor group 110 has a position sensor 112 and an altitude sensor 114. The position sensor 112 calculates the above-described position information (for example, latitude/longitude information), for example, by processing GPS information. The altitude sensor 114 calculates a height of the communication device 10, i.e., a height of the animal to which the communication device 10 is attached. The sensor group 110 outputs generated information (hereinafter referred to as sensing information) to the communicator 120 iteratively (for example, at regular time intervals).

The communicator 120 immediately wirelessly transmits the sensing information output by the sensor group 110 to the position information transmission device 20. Also, the communicator 120 stores the above-described communication device ID. When the sensing information is transmitted, the communicator 120 also transmits the communication device ID.

Figure 3:
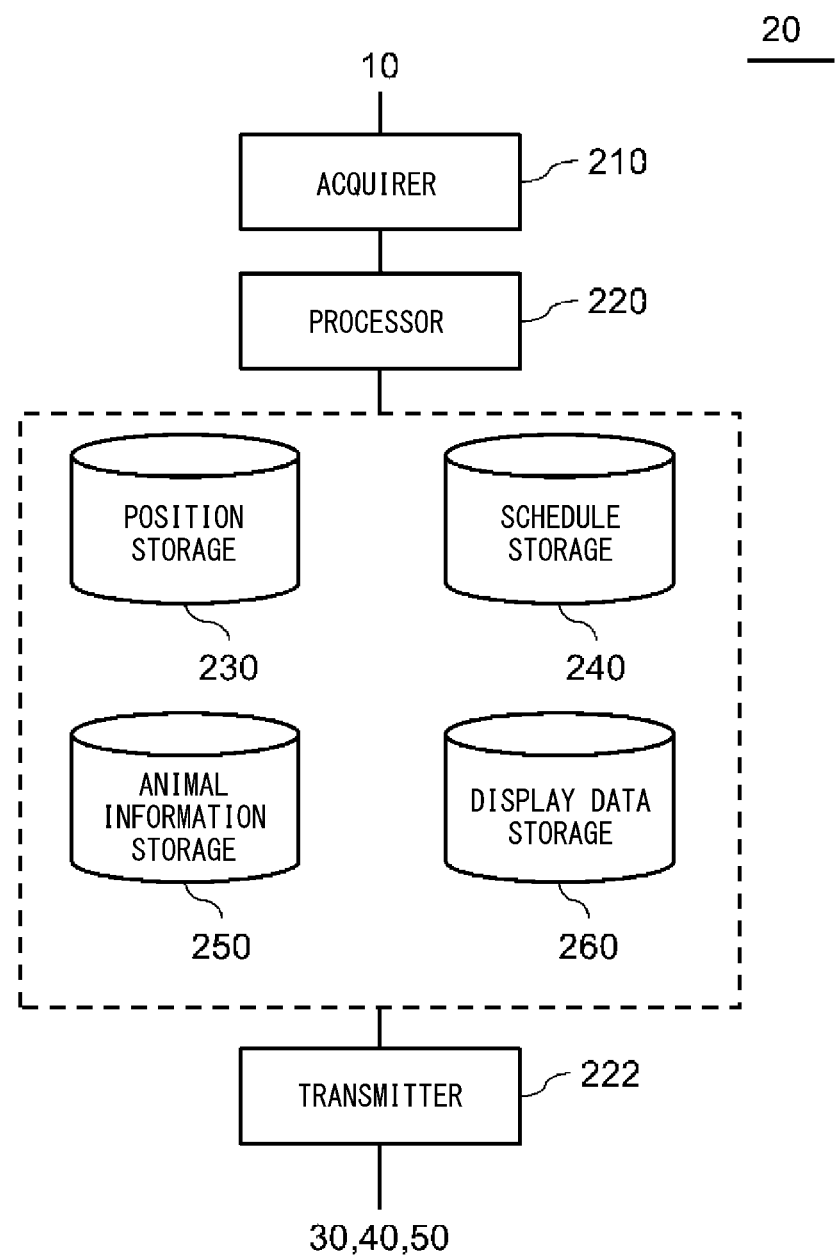
FIG. 3 is a diagram showing an example of a functional configuration of the position information transmission device.

FIG. 3 is a diagram showing an example of a functional configuration of the position information transmission device 20. The position information transmission device 20 includes an acquirer 210, a processor 220, a transmitter 222, and various types of data storages. In the example shown in FIG. 3, these data storages are a position storage 230, a schedule storage 240, an animal information storage 250, and a display data storage 260.

The acquirer 210 acquires data transmitted from the communication device 10. The processor 220 processes the data acquired by the acquirer 210 and updates the data storage described above as necessary. The transmitter 222 generates display data to be displayed by the in-zoo display device 30, the user terminal 40, and the staff member terminal 50 using the information stored in the above-described storage and transmits the generated display data to each of the in-zoo display device 30, the user terminal 40, and the staff member terminal 50. At this time, preferably, the transmitter 222 individually performs a display data generation process and a transmission process for each of the in-zoo display device 30, the user terminal 40, and the staff member terminal 50.

FIG. 4 is a diagram showing an example of information stored in the position storage 230. In the example shown in FIG. 4, the position storage 230 stores the sensing information received together with the communication device ID for each communication device ID. In addition to the latest sensing information, the position storage 230 also stores previously received sensing information (history data).

The latest sensing information indicates the latest position of the animal. Also, the processor 220 processes the history data of the sensing information. For example, the processor 220 detects an abnormality in the communication device 10 using a history of positions of the animal indicated in the sensing information. For example, the processor 220 determines that the communication device 10 has been detached from the animal when a position and a height indicated in the sensing information have not changed for a certain time period (for example, 1 hour). At this time, the processor 220 may determine that the communication device 10 has been detached from the animal only when the position and the height indicated in the sensing information are in a specific region. The specific region is, for example, a region where the animal is unlikely to sleep. Also, when an output from a specific sensor has not been continuously obtained for a certain time period, the processor 220 may determine that the sensor has failed. When an abnormality occurs in the communication device 10, the processor 220 stores information indicating the abnormality (hereinafter referred to as abnormality information) in the position storage 230 in association with the communication device ID of the communication device 10. In the example shown in FIG. 4, the position storage 230 also stores information indicating a type of abnormality (detachment, a failure, or the like).

FIG. 5 is a diagram showing an example of information stored in the schedule storage 240. In the example shown in FIG. 5, the schedule storage 240 stores a date and time when the animal will be open to the public, i.e., a date and time when the animal will be assumed to be in the exhibition area, for each type or individual of the animal. The date and time for each type or individual of the animal is displayed on the in-zoo display device 30 and the user terminal 40 as necessary.

FIG. 6 is a diagram showing an example of information stored in the animal information storage 250. For each communication device ID, the animal information storage 250 stores a type and an individual name (or individual identification information) of an animal to which the communication device 10 indicated in the communication device ID is attached and a current position of the communication device 10.

In the example shown in FIG. 6, the current position of the communication device 10 is a name of a facility where the communication device 10 is present. Specific examples of the facility name are, for example, an exhibition area (an area that is open to the public), a bedroom (a backyard), the inside of the zoo, a rental, and absence (a missing number), but the facility name is not limited thereto. The "exhibition area" indicates that the animal is in an area where the visitor can see the animal and the "bedroom" indicates that the animal is in an area where the visitor cannot see the animal "Inside of the zoo" indicates that the animal is at a place different from the "exhibition area" and the "bedroom" within the zoo and "rental" indicates that the animal is in another zoo. "Absence" indicates that no animal is wearing the communication device 10.

The above-described current position is generated by the processor 220 using the sensing information and the map information stored in the position storage 230. The map information used here is, for example, map information in which the above-described facility name is associated with latitude/longitude information indicating a range of the facility, and may be stored in advance in, for example, the animal information storage 250. The processor 220 determines a facility whose latitude/longitude information overlaps a position indicated in the sensing information among facilities as the current position.

Figures 7, 8:
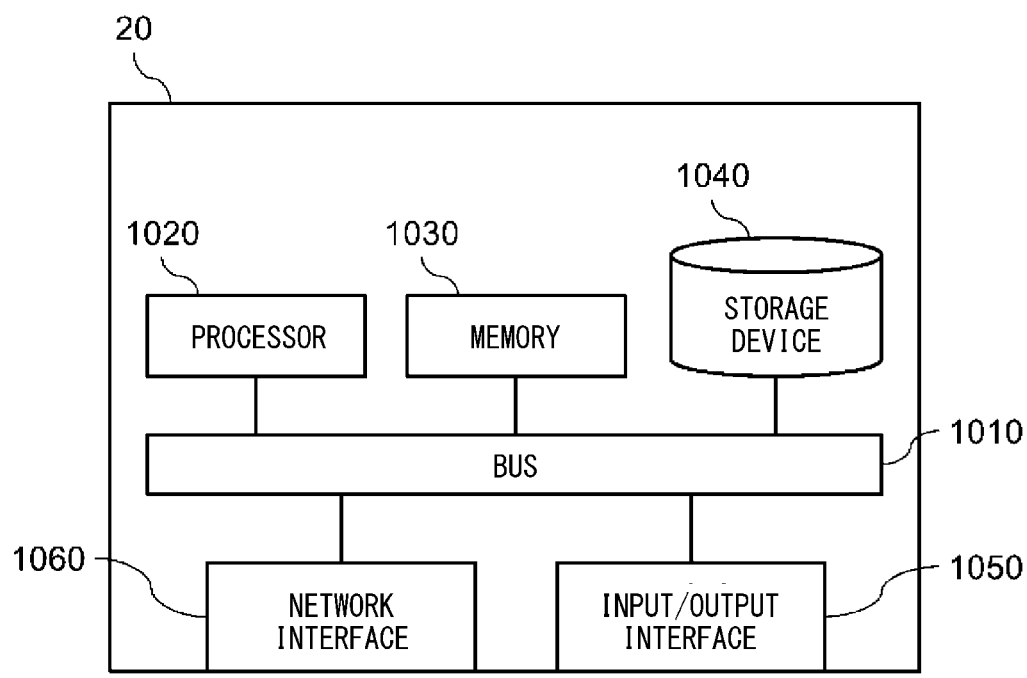
FIG. 7 is a diagram showing an example of information stored in a display data storage.
FIG. 8 is a block diagram showing an example of a hardware configuration of the position information transmission device.

FIG. 7 is a diagram showing an example of information stored in the display data storage 260. The display data storage 260 stores map data of the inside of the zoo that becomes the basis of the display data. Specifically, the display data storage 260 stores map data for displaying an overall view of the zoo and map data for displaying details of the exhibition area of the animal for each type of animal (i.e., animal identification information). Further, the display data storage 260 stores the current position of the animal (or an animal present in an area thereof) in association with the map data for each type of animal. This current position is similar to a current position stored in the animal information storage 250. Also, the display data storage 260 preferably stores the current position for each individual (for example, for each communication device ID).

FIG. 8 is a block diagram showing an example of a hardware configuration of the position information transmission device 20. The position information transmission device 20 includes a bus 1010, a processor 1020, a memory 1030, a storage device 1040, an input/output interface 1050, and a network interface 1060.

The bus 1010 is a data transmission path for the processor 1020, the memory 1030, the storage device 1040, the input/output interface 1050, and the network interface 1060 to transmit and receive data to and from each other. However, a method of connecting the processor 1020 and the like to each other is not limited to a bus connection.

The processor 1020 is a processor implemented by a central processing unit (CPU), a graphics processing unit (GPU), or the like.

The memory 1030 is a main storage device implemented by a random-access memory (RAM) or the like.

The storage device 1040 is an auxiliary storage device implemented by a hard disk drive (HDD), a solid-state drive (SSD), a memory card, a read-only memory (ROM), or the like. The storage device 1040 stores a program module that implements functions of the position information transmission device 20 (for example, the acquirer 210, the processor 220, and the transmitter 222). When the processor 1020 loads each of these program modules into the memory 1030 and executes each program module, each function corresponding to the program module is implemented. Also, the storage device 1040 also functions as various types of storages (for example, the position storage 230, the schedule storage 240, the animal information storage 250, and the display data storage 260).

The input/output interface 1050 is an interface for connecting the position information transmission device 20 and various types of input/output devices.

The network interface 1060 is an interface for connecting the position information transmission device 20 to other devices (for example, the communication device 10, the in-zoo display device 30, the user terminal 40, and the staff member terminal 50) on the network.

Figure 9:
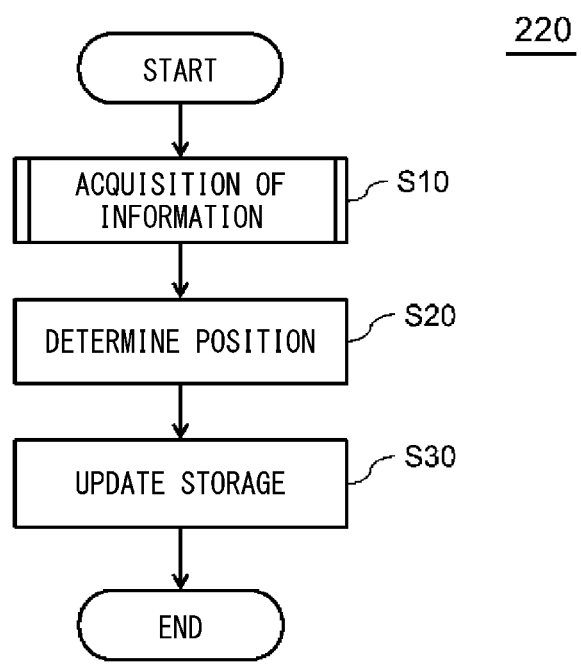
FIG. 9 is a flowchart showing an example of a process performed by a processor of the position information transmission device.

FIG. 9 is a flowchart showing an example of a process performed by the processor 220 of the position information transmission device 20. In the present flowchart, the communication device 10 is already attached to an animal and sensing information and a communication device ID are output to the position information transmission device 20 iteratively, for example, every minute.

When the acquirer 210 receives the sensing information and the communication device ID, the processor 220 performs a process of updating the position storage 230 using the sensing information and the communication device ID (step S10). A detailed example of step S10 will be described below.

Subsequently, in order to update the animal information storage 250, the processor 220 determines a current position of the animal corresponding to the communication device 10 using the sensing information (step S20).

Subsequently, the processor 220 causes the animal information storage 250 and the display data storage 260 to store the current position identified in step S20 in association with the communication device ID corresponding to the current position (step S30). In this way, the animal information storage 250 and the display data storage 260 store the latest position that is the latest current position of each animal.

Figure 10:
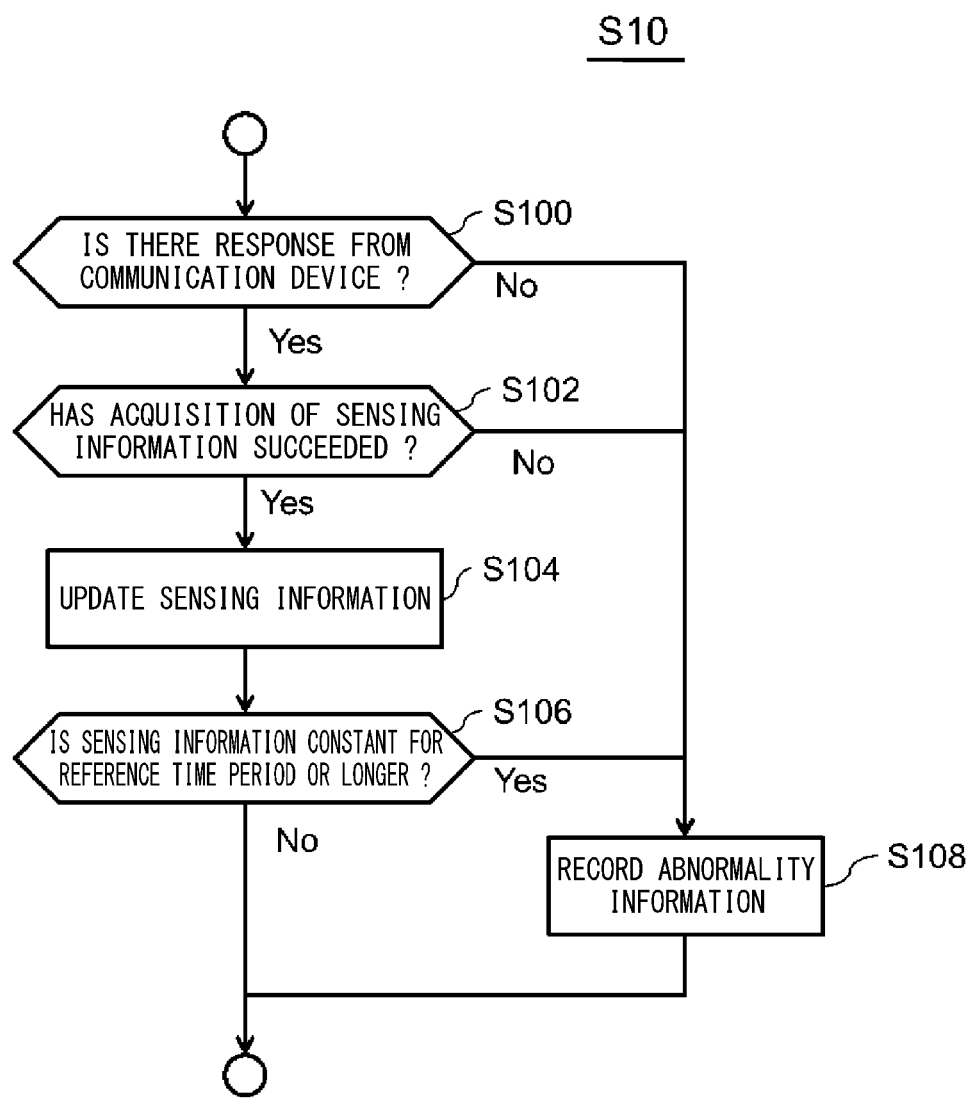
FIG. 10 is a flowchart showing a detailed example of step S10 in FIG. 9.

FIG. 10 is a flowchart showing a detailed example of step S10 in FIG. 9. First, the acquirer 210 iteratively performs the following process with respect to each of the plurality of communication devices 10.

First, the acquirer 210 requests the communication device 10 to transmit information. When there is a response from the communication device 10 (step S100: Yes) and the acquisition of the sensing information has succeeded (step S102: Yes), the acquirer 210 causes the position storage 230 to store the acquired sensing information (step S104). The processor 220 uses a history of the sensing information and currently acquired sensing information, determines that the communication device 10 has been detached from the animal when a position indicated in the sensing information has not changed for a certain time period (step S106: Yes), and causes the position storage 230 to store abnormality information indicating the detachment (step S108).

Also, when the processor 220 has not received a response from the communication device 10 in step S100 (step S100: No), the processor 220 causes the position storage 230 to store abnormality information indicating that there is no response in association with the communication device ID of the communication device 10 (step S108). Also, when the acquisition of the sensing information in step S102 has failed (step S102: No), the processor 220 causes the position storage 230 to store abnormality information indicating that the sensor has failed (step S108).

Figure 11:
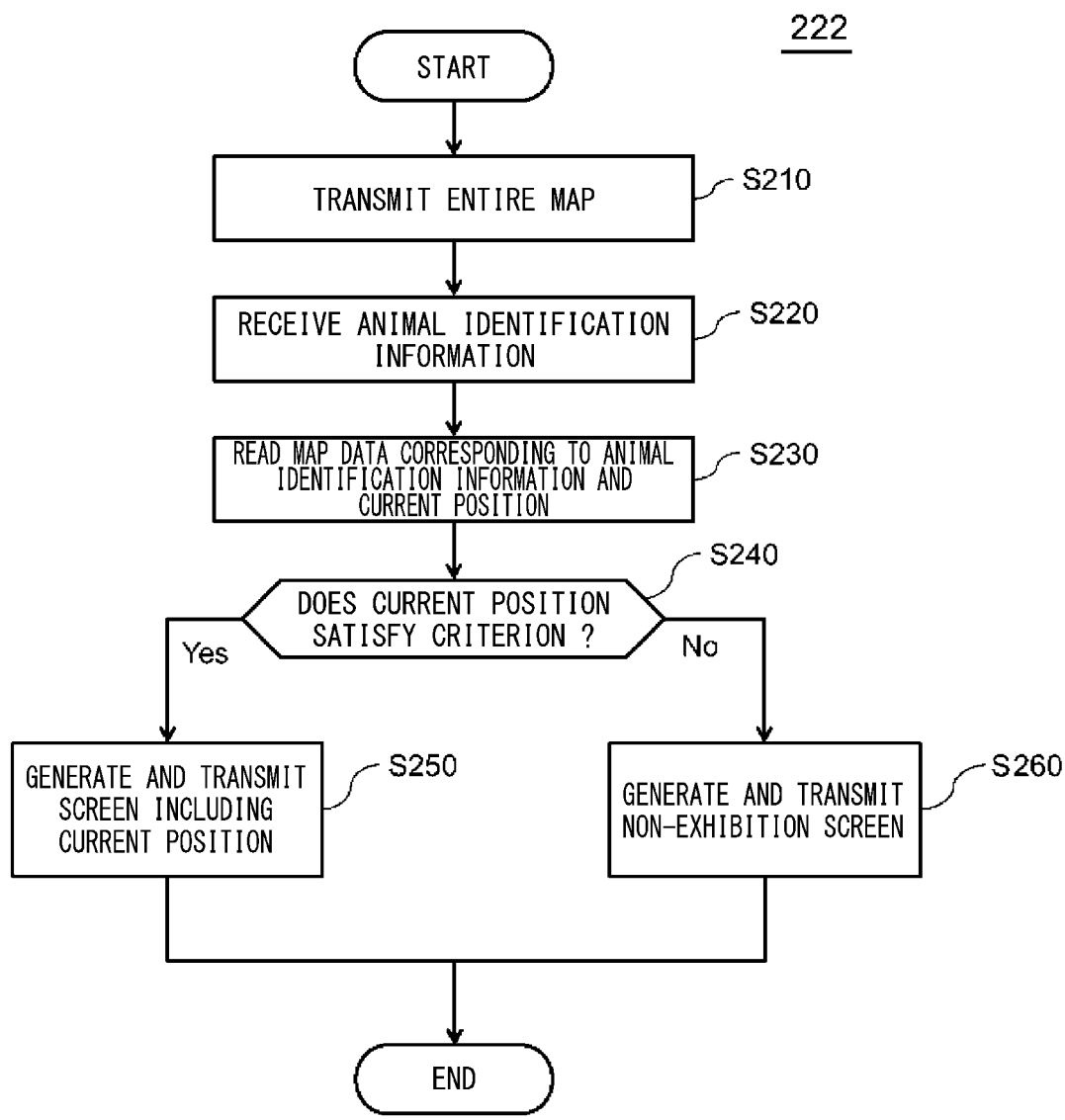
FIG. 11 is a diagram showing a first example of the process performed by a transmitter of the position information transmission device.

FIG. 11 is a diagram showing a first example of a process performed by the transmitter 222 of the position information transmission device 20. The process shown in FIG. 11 is performed when the user terminal 40 is allowed to display a map of the inside of the zoo using the information stored in the display data storage 260. FIGS. 12(A) and 12(B) show an example of a screen displayed on the user terminal 40.

First, the transmitter 222 reads the entire map data and transmits the read map data to the user terminal 40, so that the user terminal 40 is allowed to display the entire map of the zoo (step S210 and FIG. 12(A)). In this entire map, animal identification information of animals that are exhibited in the exhibition area is embedded for each exhibition area. As shown in FIG. 12(A), the user of the user terminal 40 selects a specific exhibition area from the entire map. The user terminal 40 transmits the animal identification information corresponding to the exhibition area to the position information transmission device 20 (step S220).

When the animal identification information is received from the user terminal 40, the transmitter 222 reads map data corresponding to the animal identification information and a current position of an animal corresponding to the animal identification information from the display data storage 260 (step S230). When the read position data satisfies a criterion, for example, when the animal is in the exhibition area (step S240: Yes), the transmitter 222 generates screen data using the read map data and the read position and transmits the screen data to the user terminal 40 (step S250).

When the screen data is received, the user terminal 40 performs a display process using the screen data (FIG. 12(B)). In this display process, the screen data includes, for example, an outline of the exhibition area selected in step S220 and the current position of the animal.

On the other hand, when the current position of the animal read in step S230 does not satisfy the criterion (step S240: No), the transmitter 222 generates a screen indicating that the current position of the animal does not satisfy the criterion (for example, a screen indicating that the animal is not exhibited) and transmits the screen to the user terminal 40 (step S260).

In addition to the process shown in FIG. 11, the transmitter 222 transmits screen data to the in-zoo display device 30 and/or the staff member terminal 50.

For example, when the in-zoo display device 30 is installed for each exhibition area, the transmitter 222 causes the in-zoo display device 30 to constantly display a screen where the current position of the animal in the exhibition area is superimposed on the map of the exhibition area.

Also, when the abnormality information is stored in the position storage 230, after the transmitter 222 reads the communication device ID corresponding to the abnormality information from the position storage 230 and reads information of the animal corresponding to the communication device ID from the animal information storage 250, the abnormality information and the read information of the animal may be associated and displayed on the staff member terminal 50. At this time, the transmitter 222 may transmit the current position of the communication device 10 to the staff member terminal 50 so that the staff member terminal 50 is allowed to display the current position of the communication device 10.

Further, the transmitter 222 may perform the process shown in FIG. 11 with respect to the in-zoo display device 30 and the staff member terminal 50.

Figure 13:
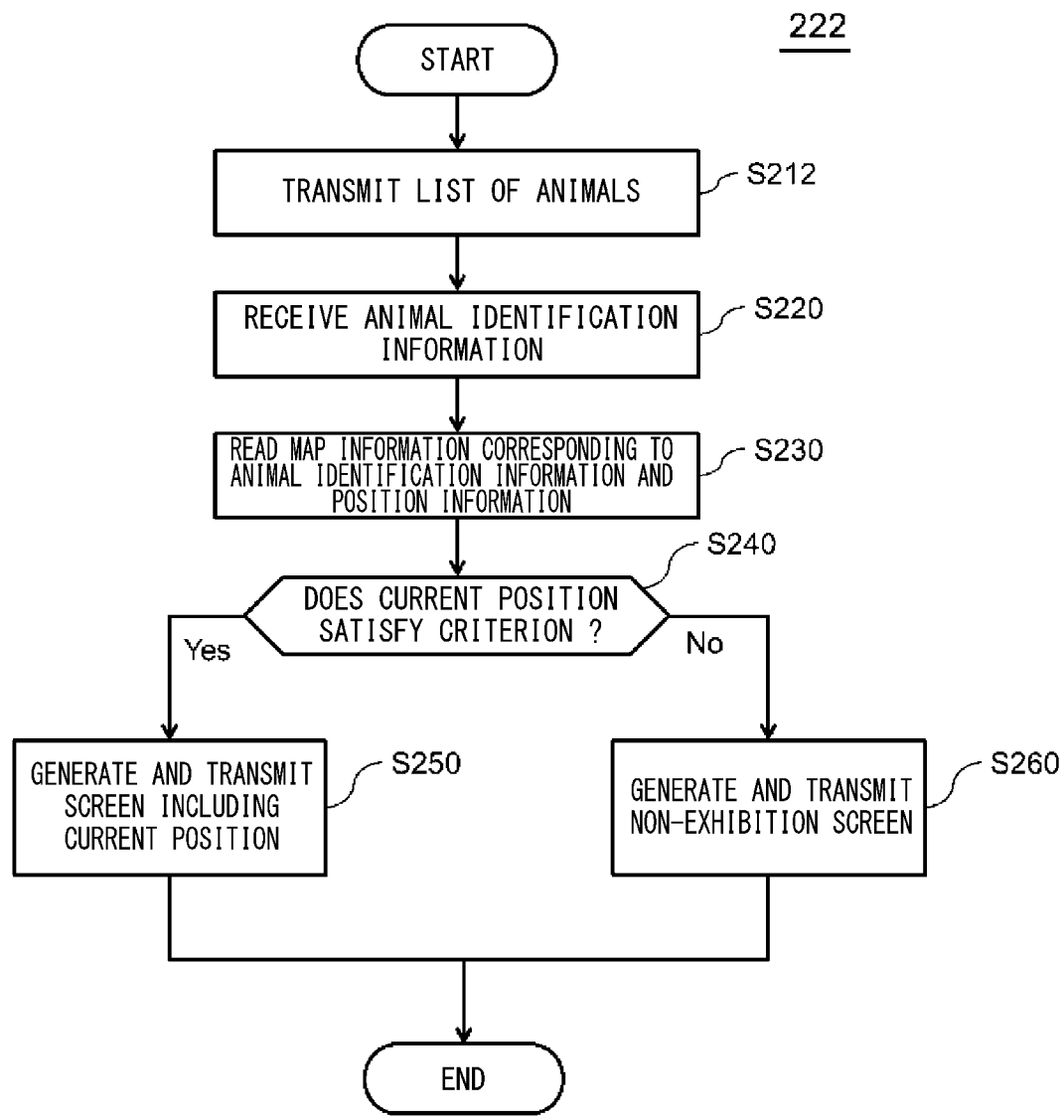
FIG. 13 is a diagram showing a second example of the process performed by the transmitter.
Figure 14:
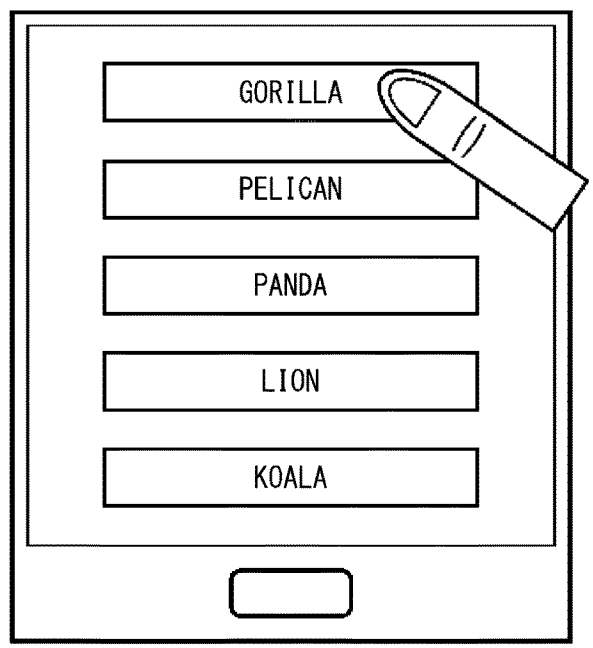
FIG. 14 is a diagram showing an example of a display screen of the in-zoo display device or the user terminal.

FIG. 13 is a diagram showing a second example of a process performed by the transmitter 222. The process shown in FIG. 13 is similar to the process shown in FIG. 11, except that a list of animals (for example, FIG. 14) is transmitted instead of transmitting the entire map of the zoo (step S212). Specifically, the user of the user terminal 40 selects a desired animal from the list of animals. The user terminal 40 transmits the animal identification information of the selected animal to the position information transmission device 20. Subsequent processing is similar to the processing shown in FIG. 11.

As described above, according to the present embodiment, the communication device 10 is attached to the animal The communication device 10 includes the position sensor 112. When the information transmitted from the position sensor 112 satisfies a criterion (for example, when the animal is within the exhibition area), the transmitter 222 of the position information transmission device 20 generates a screen showing the current position of the animal and transmits the screen to the user terminal 40. Thus, it is possible to provide appropriate information to a visitor to a zoo or a person who desires to visit the zoo.

Also, when an abnormality has occurred in the communication device 10, the transmitter 222 causes the staff member terminal 50 to perform a display process indicating the abnormality. Accordingly, a zoo staff member can easily ascertain that an abnormality has occurred in the communication device 10.

Second Embodiment

Figure 15:
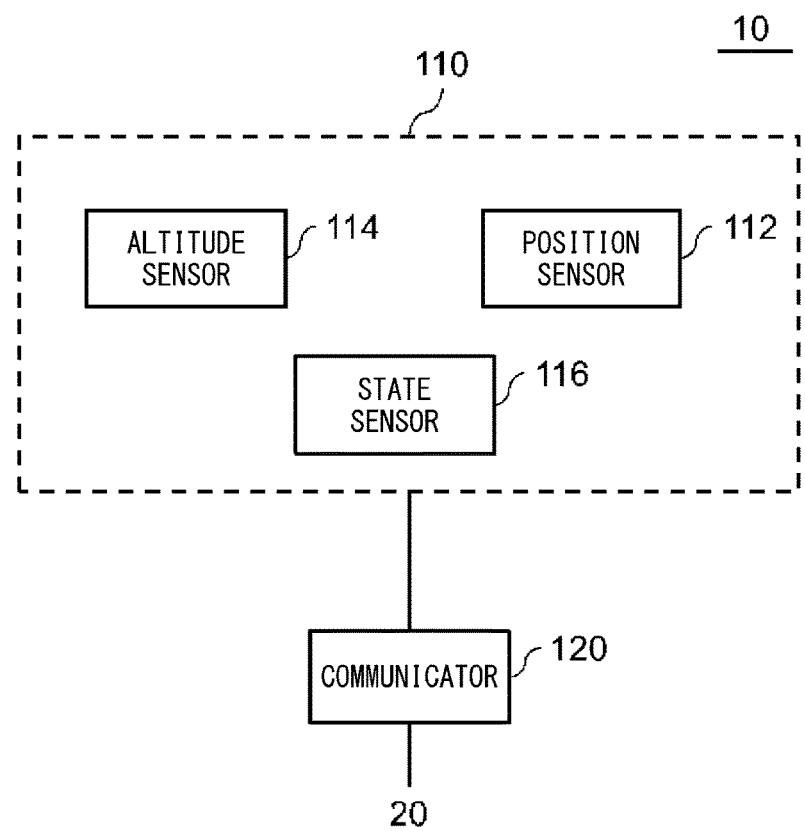
FIG. 15 is a diagram showing a functional configuration of a communication device according to a second embodiment.

FIG. 15 is a diagram showing a functional configuration of a communication device 10 according to the present embodiment. The configuration of the communication device 10 according to the present embodiment is similar to that of the first embodiment, except that a sensor group 110 further includes a state sensor 116.

The state sensor 116 generates information (hereinafter referred to as state information) indicating a state of the animal to which the communication device 10 is attached. The state information preferably includes state information of the animal, for example, such as a heart rate, a body temperature, and a respiration rate. This state information is transmitted as a part of the sensing information to a position information transmission device 20. The position information transmission device 20 uses the state information to determine an activity state (for example, acting, sleeping, or eating) of the animal.

Figure 16:
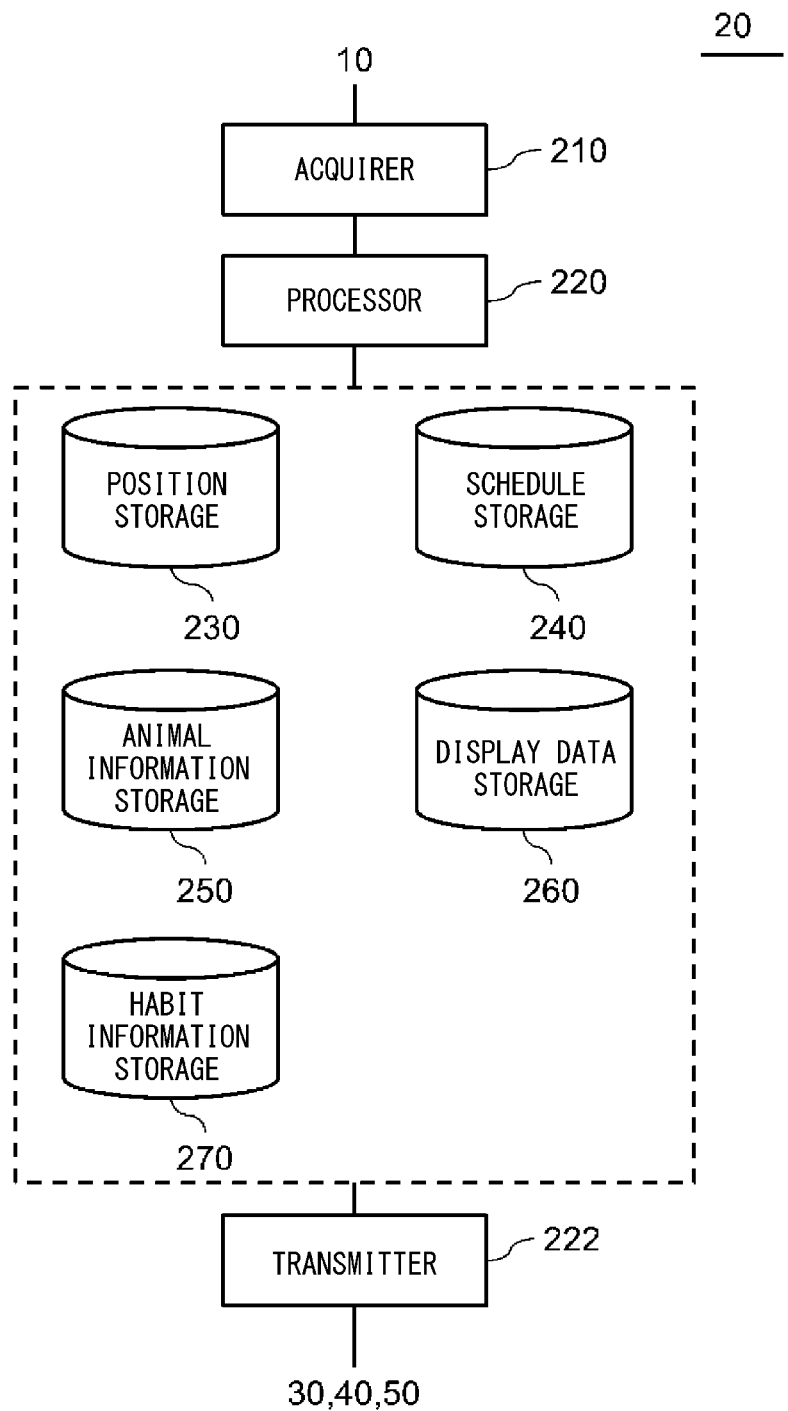
FIG. 16 is a diagram showing a functional configuration of a position information transmission device according to the second embodiment.

FIG. 16 is a diagram showing a functional configuration of the position information transmission device 20 according to the present embodiment. The position information transmission device 20 according to the present embodiment is similar to the position information transmission device 20 according to the first embodiment, except that a position storage 230 and an animal information storage 250 have different data configurations and a habit information storage 270 is further provided.

FIG. 17 is a diagram showing an example of the data configuration of the position storage 230 according to the present embodiment. The configuration of the position storage 230 in the present embodiment is similar to the configuration of the position storage 230 according to the first embodiment, except that state information is further stored for each communication device ID.

FIG. 18 is a diagram showing an example of the data configuration of the animal information storage 250 according to the present embodiment. The configuration of the animal information storage 250 in the present embodiment is similar to the configuration of the animal information storage 250 according to the first embodiment, except that an activity state is further stored for each communication device ID. The activity state indicates, for example, whether the animal is acting, sleeping, or eating, and is generated by a processor 220 of the position information transmission device 20 processing state information. The animal information storage 250 also stores statistical data of the activity state for each communication device ID.

Figure 19:
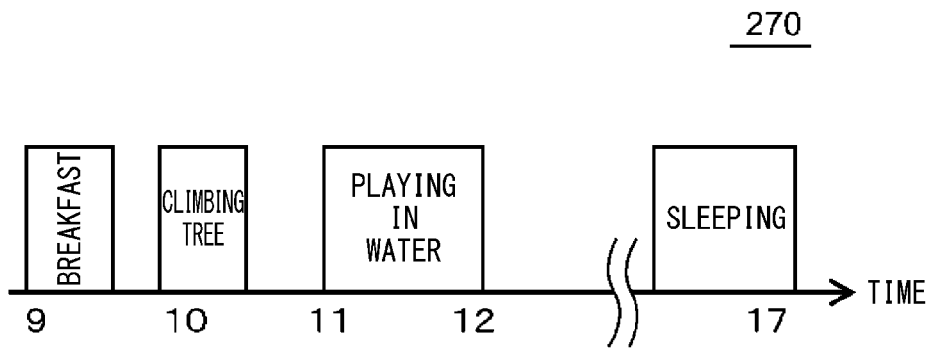
FIG. 19 is a diagram showing an example of a data configuration of a habit information storage.

FIG. 19 is a diagram showing an example of the data configuration of the habit information storage 270. As described above, the habit information storage 270 stores habits of the animal to which the communication device 10 is attached for each communication device ID together with a time point when the habit is likely to be performed. For example, in the example shown in FIG. 19, the habit information storage 270 stores a time point when a certain animal has breakfast, a time point when a specific activity (for example, climbing a tree or playing in the water) is performed, and a time point of sleeping as habit information. The habit information is generated by the processor 220 processing the statistical data of the activity state.

Figure 20:
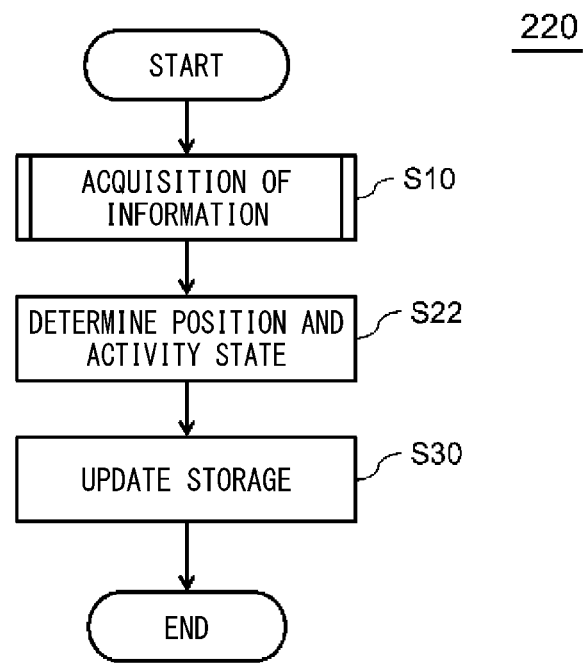
FIG. 20 is a diagram showing an example of a process performed by a processor according to the second embodiment.

FIG. 20 is a diagram showing an example of a process performed by the processor 220 according to the present embodiment. The process shown in FIG. 20 corresponds to the process described with reference to FIG. 9 in the first embodiment.

First, the processor 220 performs a process shown in step S10. Subsequently, the processor 220 determines a position and an activity state of the animal (step S22) and updates the storage (step S30).

Figure 21:
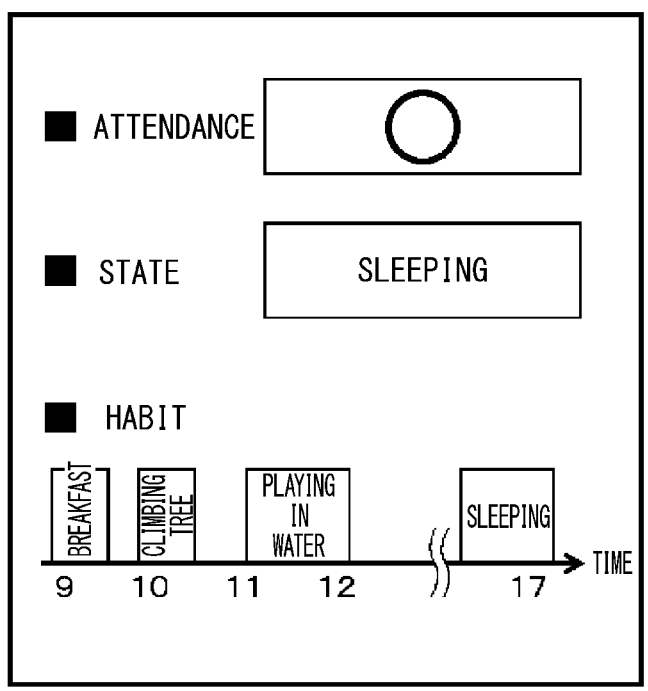
FIG. 21 is a diagram showing a display example of an in-zoo display device according to the second embodiment.

FIG. 21 is a diagram showing a display example of an in-zoo display device 30 in the present embodiment. In the example shown in FIG. 21, the in-zoo display device 30 displays the information transmitted in step S250 of FIG. 11. Specifically, the in-zoo display device 30 displays the presence/absence (attendance) of the exhibition of a specific animal (individual), a current activity state, and habit information.

Also, the position information transmission device 20 may cause a user terminal 40 to display a screen shown in FIG. 21. In this case, a transmitter 222 acquires animal identification information of a desired animal from the user terminal 40 and transmits habit information associated with a communication device ID corresponding to the animal identification information to the user terminal 40.

As described above, effects similar to those of the first embodiment can also be obtained in the present embodiment. Also, the communication device 10 includes the state sensor 116. The position information transmission device 20 determines the activity state of the animal using a detection result of the state sensor 116 and causes the in-zoo display device 30 and/or the user terminal 40 to display the activity state. Accordingly, a visitor to a zoo (an example of a visitor) or a person who desires to visit the zoo can easily ascertain the current activity state of the target animal. Also, as shown in FIG. 21, the position information transmission device 20 causes the in-zoo display device 30 and the user terminal 40 to further display habit information for each animal. Accordingly, a visitor to a zoo or a person who desires to visit the zoo can easily ascertain when the target animal will be likely to be in a desired activity state.

Third Embodiment

Figure 22:
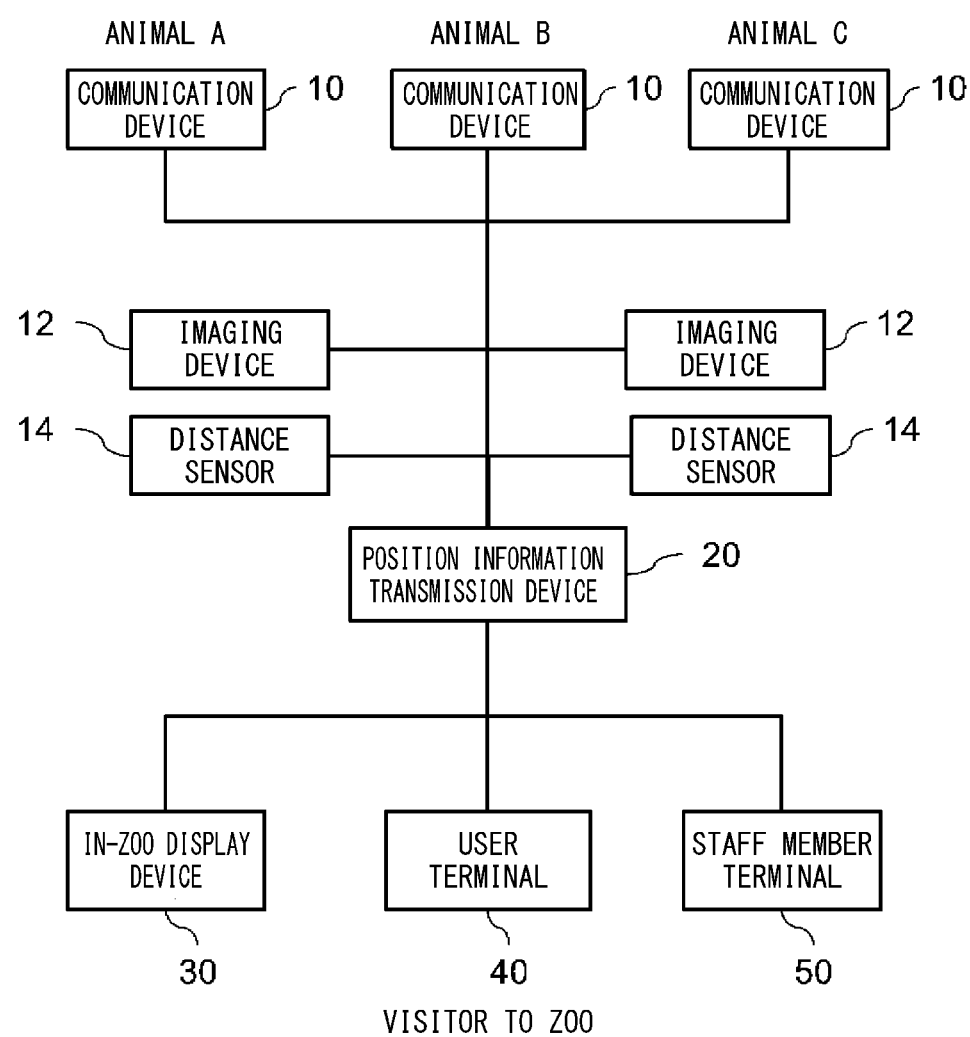
FIG. 22 is a diagram showing an environment in which a position information transmission device according to a third embodiment is used.

FIG. 22 is a diagram showing an environment in which a position information transmission device 20 according to the present embodiment is used. The configuration of the position information transmission device 20 in the present embodiment is similar to the configuration of the position information transmission device 20 according to the second embodiment, except that information is further acquired from an imaging device 12 and a distance sensor 14 and the information is processed.

At least one imaging device 12 is provided for each of the plurality of exhibition areas. When a plurality of imaging devices 12 are provided in one exhibition area, these imaging devices 12 are installed at places different from each other. The imaging device 12 iteratively generates an image of the exhibition area and transmits the image to the position information transmission device 20 together with information for identifying the imaging device 12 (hereinafter referred to as an imaging device ID). Thus, the image transmitted by the imaging device 12 shows the animals in the exhibition area.

The distance sensor 14 is paired with the imaging device 12 and is provided at the same place as the imaging device 12. The distance sensor 14 measures a distance from the distance sensor 14 to the animal in the imaging area of the imaging device 12. The distance sensor 14 transmits the generated distance information to the position information transmission device 20 together with the information for identifying the distance sensor 14 (hereinafter referred to as a distance sensor ID). The distance information is used to select the imaging device 12 closest to the animal when the same animal is shown in the plurality of imaging devices 12.

Figure 23:
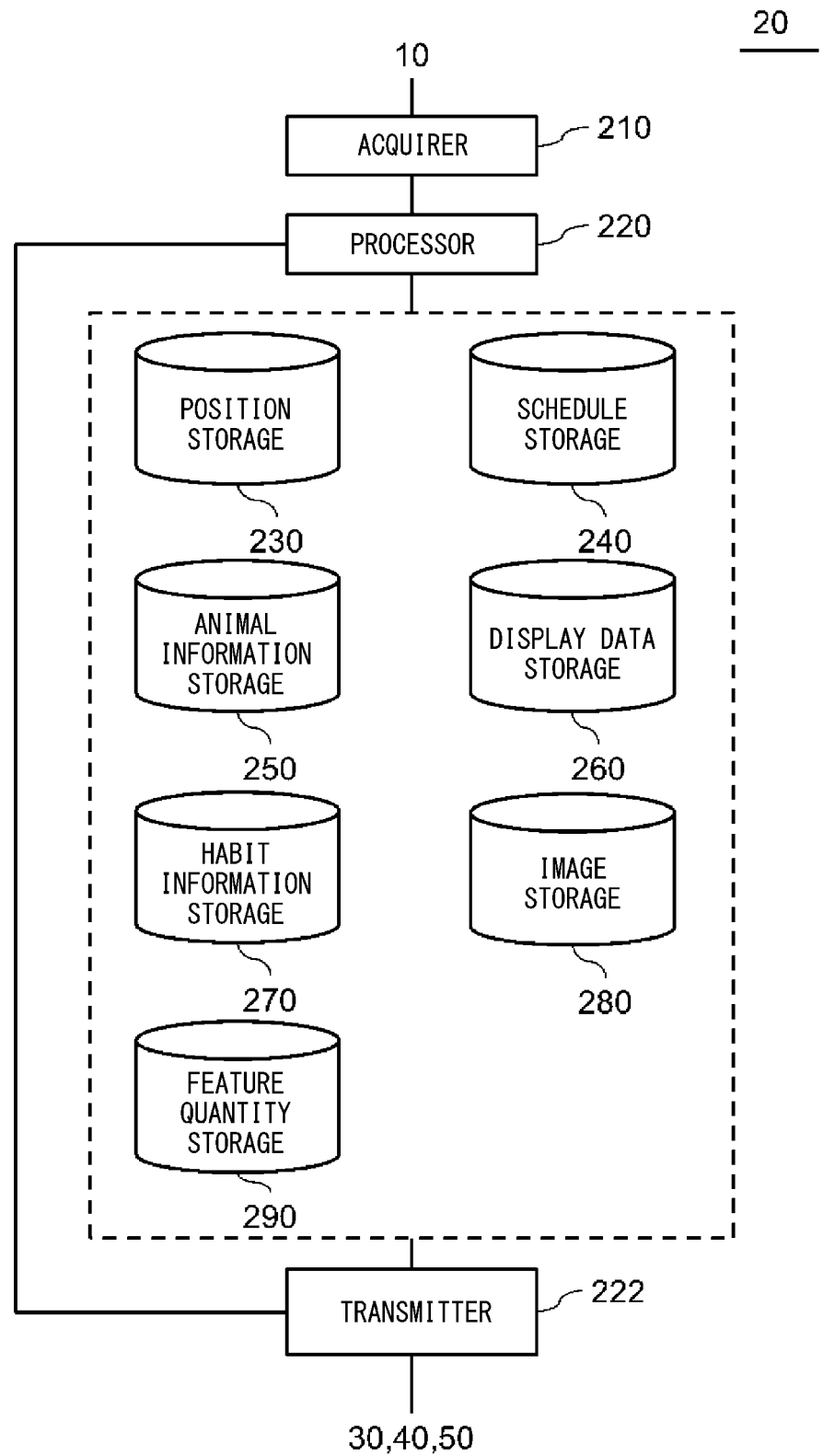
FIG. 23 is a diagram showing an example of a functional configuration of the position information transmission device according to the third embodiment.

FIG. 23 is a diagram showing an example of a functional configuration of the position information transmission device 20 according to the present embodiment. The configuration of the position information transmission device 20 according to the present embodiment is similar to the configuration of the position information transmission device 20 according to the second embodiment, except that an image storage 280 and a feature quantity storage 290 are provided.

FIG. 24 is a diagram showing an example of data stored in the image storage 280. In the example shown in FIG. 24, the image storage 280 stores an imaging device ID of the imaging device 12 installed in the exhibition area of the animal and a distance sensor ID of the distance sensor 14 installed in the exhibition area according to the animal identification information. The image storage 280 further stores images generated by the imaging device 12 corresponding to the imaging device ID and distance information generated by the distance sensor 14 corresponding to the distance sensor ID. The image storage 280 also stores log data of these images and the distance information.

FIG. 25 is a diagram showing an example of data stored in the feature quantity storage 290. In the example shown in FIG. 25, the feature quantity storage 290 stores a feature quantity of each animal used in image processing. Here, preferably, the feature quantity storage 290 stores a feature quantity for each individual animal.

Figure 26:
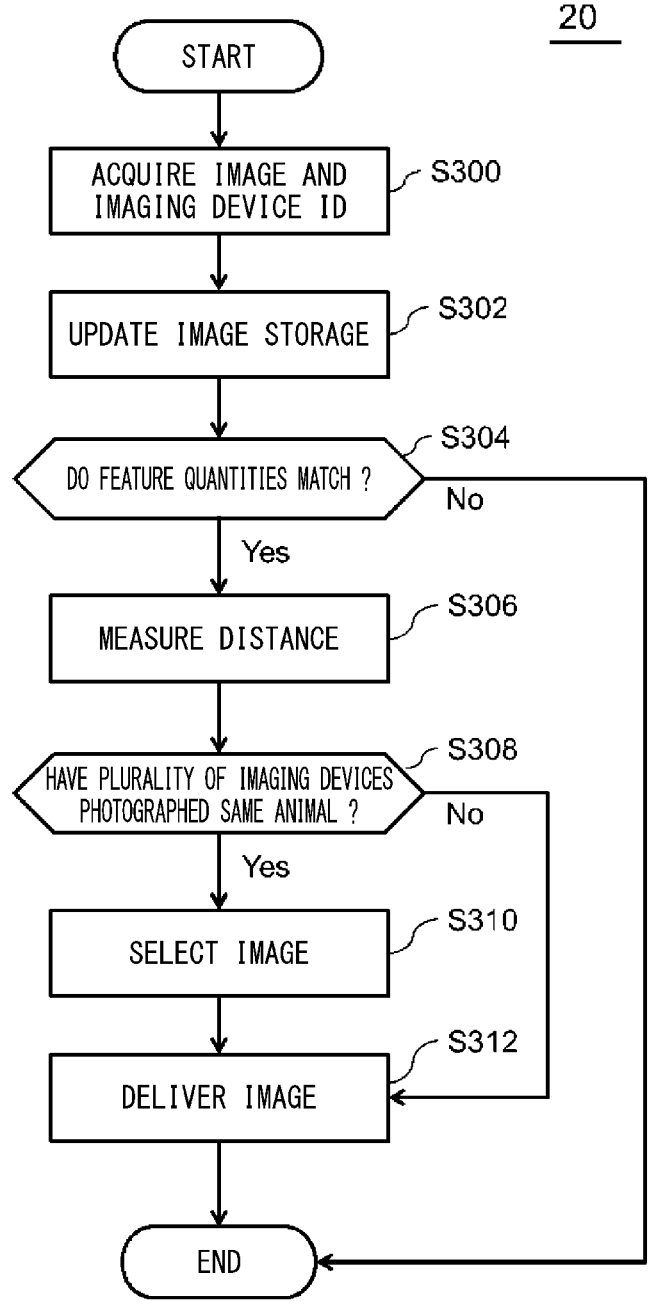
FIG. 26 is a diagram showing an example of a process performed by a processor according to the third embodiment.

FIG. 26 is a diagram showing an example of a process performed by a processor 220 according to the present embodiment. In the present embodiment, the processor 220 processes information generated by the imaging device 12 and the distance sensor 14 in addition to the process shown in the second embodiment. FIG. 26 shows an example of the present process.

First, the imaging device 12 transmits a generated image to the position information transmission device 20 together with an imaging device ID. At this time, the imaging device 12 may transmit the image to the position information transmission device 20 only when the animal is shown in the generated image. The acquirer 210 of the position information transmission device 20 acquires this information.

When an image and an imaging device ID are acquired from the acquirer 210 (step S300), the processor 220 of the position information transmission device 20 causes a currently acquired image to be stored in an area of the image storage 280 corresponding to the imaging device ID (step S302). The processor 220 determines whether or not the feature quantity stored in the feature quantity storage 290 is included in the currently acquired image (step S304). At this time, preferably, the processor 220 sets the feature quantity of the animal corresponding to the imaging device ID as a processing target. When the feature quantity is included in the image (step S304: Yes), the processor 220 instructs the distance sensor 14 corresponding to the imaging device ID to measure a distance to an animal. Subsequently, the distance sensor 14 generates distance information indicating the distance to the animal and transmits the distance information to the position information transmission device 20 (step S306).

When the plurality of imaging devices 12 have photographed the same animal (step S308: Yes), the transmitter 222 of the position information transmission device 20 selects an image to be delivered to the in-zoo display device 30 and the user terminal 40 using the distance information generated by the distance sensor 14 (step S310). For example, the transmitter 222 selects an image generated by the imaging device 12 corresponding to the distance sensor 14 showing a value with the smallest distance information as the image to be delivered. The transmitter 222 delivers the selected image to the in-zoo display device 30 and the user terminal 40 (step S312).

Also, when only one imaging device 12 has photographed the animal (step S308: No), the transmitter 222 delivers the image generated by the imaging device 12 to the in-zoo display device 30 and the user terminal 40 (step S312). At this time, the transmitter 222 may deliver the image only to the user terminal 40 that has registered that the image related to the animal is desired to be delivered.

Also, the processor 220 may generate state information by processing the image generated by the imaging device 12. In this case, a sensor group 110 of the communication device 10 may not have the state sensor 116.

As described above, effects similar to those of the second embodiment can also be obtained in the present embodiment. Also, when the animal is shown in the image generated by the imaging device 12, the position information transmission device 20 delivers the image to the in-zoo display device 30 and the user terminal 40. Accordingly, it is possible to provide appropriate information to a visitor to a zoo or a person who desires to visit the zoo.

Although the embodiments of the present invention have been described above with reference to the drawings, these are examples of the present invention and various configurations other than the above-described configuration can be adopted.

Although a plurality of processing steps (processes) have been described in order in the plurality of flowcharts used in the above description, the order in which the processing steps are executed in each embodiment is not limited to the order described in the embodiments. In each embodiment, the order of the processing steps shown in the drawing can be changed in a range without causing a problem in content. Also, the above-described embodiments can be combined in a range in which content does not conflict.

Although some or all of the above-described embodiments can be described as in the following appendixes, the present invention is not limited to the following appendixes.

1. A position information transmission device including:
an acquirer configured to acquire position information of a communicator or an animal and identification information for identifying the communicator or the animal from the communicator attached to each of a plurality of animals within a facility; and
a transmitter configured to transmit the position information to a display with respect to the animal whose position information satisfies a criterion.

2. The position information transmission device according to appendix 1, wherein the transmitter transmits the position information to the display when a position indicated in the position information is within an exhibition area of the animal corresponding to the identification information received together with the position information.

3. The position information transmission device according to appendix 1 or 2, wherein the transmitter transmits abnormality information about the animal corresponding to the position information to a terminal used by a staff member of the facility when the position information has not changed for a reference time period or longer.

4. The position information transmission device according to appendix 3, wherein the transmitter transmits the abnormality information to the terminal together with the position information.

5. The position information transmission device according to any one of appendixes 1 to 4,
wherein the display device is a terminal owned by a visitor to the facility, and
wherein the transmitter receives designation information for designating the animal from the terminal and transmits the position information to the display when the position information of the animal indicated in the designation information satisfies the criterion.

6. The position information transmission device according to any one of appendixes 1 to 5, wherein the transmitter transmits a notification indicating that the criterion is not satisfied to the display with respect to the animal whose position information does not satisfy the criterion.

7. The position information transmission device according to any one of appendixes 1 to 6, wherein the acquirer further includes a processor configured to acquire state information indicating a state of the animal generated by a sensor and process the state information, and wherein the transmitter further transmits a processing result of the processor to the display.

8. The position information transmission device according to appendix 6 or 7, wherein the transmitter reads habit information corresponding to the identification information acquired by the acquirer from a habit information storage storing the habit information that is a result of statistical processing of the state information for each animal and transmits the read habit information to the display.

9. The position information transmission device according to any one of appendixes 6 to 8, wherein the sensor is attached to the animal, and wherein the acquirer acquires the state information from the communicator.

10. The position information transmission device according to any one of appendixes 6 to 8, wherein the sensor is an imager configured to generate an image of the animal.

11. A position information transmission method including:

acquiring, by a computer, position information of a communicator or an animal and identification information for identifying the communicator or the animal from the communicator attached to each of a plurality of animals within a facility; and transmitting, by the computer, the position information to a display with respect to the animal whose position information satisfies a criterion.

12. The position information transmission method according to appendix 11, wherein the computer transmits the position information to the display when a position indicated in the position information is within an exhibition area of the animal corresponding to the identification information received together with the position information.

13. The position information transmission method according to appendix 11 or 12, wherein the computer transmits abnormality information about the animal corresponding to the position information to a terminal used by a staff member of the facility when the position information has not changed for a reference time period or longer.

14. The position information transmission method according to appendix 13, wherein the computer transmits the abnormality information to the terminal together with the position information.

15. The position information transmission method according to any one of appendixes 11 to 14, wherein the display is a terminal owned by a visitor to the facility, and wherein the computer receives designation information for designating the animal from the terminal and transmits the position information to the display when the position information of the animal indicated in the designation information satisfies the criterion.

16. The position information transmission method according to any one of appendixes 11 to 15, wherein the computer transmits a notification indicating that the criterion is not satisfied to the display with respect to the animal whose position information does not satisfy the criterion.

17. The position information transmission method according to any one of appendixes 11 to 16, wherein the computer acquires state information indicating a state of the animal generated by a sensor, processes the state information, and transmits a processing result of the processor to the display.

18. The position information transmission method according to appendix 16 or 17, wherein the computer reads habit information corresponding to the identification information from a habit information storage storing the habit information that is a result of statistical processing of the state information for each animal and transmits the read habit information to the display.

19. The position information transmission method according to any one of appendixes 16 to 18, wherein the sensor is attached to the animal, and wherein the computer acquires the state information from the communicator.

20. The position information transmission method according to any one of appendixes 16 to 18, wherein the sensor is an imager configured to generate an image of the animal.

21. A program for causing a computer to have:

a function of acquiring position information of a communicator or an animal and identification information for identifying the communicator or the animal from the communicator attached to each of a plurality of animals within a facility; and a function of transmitting the position information to a display with respect to the animal whose position information satisfies a criterion.

22. The program according to appendix 21, wherein the computer is allowed to transmit the position information to the display when a position indicated in the position information is within an exhibition area of the animal corresponding to the identification information received together with the position information.

23. The program according to appendix 21 or 22, wherein the computer is allowed to transmit abnormality information about the animal corresponding to the position information to a terminal used by a staff member of the facility when the position information has not changed for a reference time period or longer.

24. The program according to appendix 23, wherein the computer is allowed to transmit the abnormality information to the terminal together with the position information.

25. The program according to any one of appendixes 21 to 24, wherein the display device is a terminal owned by a visitor to the facility, and wherein the computer is allowed to receive designation information for designating the animal from the terminal and transmit the position information to the display when the position information of the animal indicated in the designation information satisfies the criterion.

26. The program according to any one of appendixes 21 to 25, wherein the computer is allowed to transmit a notification indicating that the criterion is not satisfied to the display with respect to the animal whose position information does not satisfy the criterion.

27. The position information transmission device according to any one of appendixes 21 to 26, wherein the computer is allowed to acquire state information indicating a state of the animal generated by a sensor, process the state information, and transmit a processing result of the processor to the display.

28. The program according to appendix 26 or 27, wherein the computer is allowed to read habit information corresponding to the identification information from a habit information storage storing the habit information that is a result of statistical processing of the state information for each animal and transmit the read habit information to the display.

29. The program according to any one of appendixes 26 to 28, wherein the sensor is attached to the animal, and wherein the computer is allowed to acquire the state information from the communicator.

REFERENCE SIGNS LIST

10 Communication device
12 Imaging device
14 Distance sensor
20 Position information transmission device
30 In-zoo display device
40 User terminal
50 Staff member terminal
110 Sensor group
112 Position sensor
114 Altitude sensor
116 State sensor
120 Communicator
210 Acquirer
220 Processor
222 Transmitter
230 Position storage
240 Schedule storage
250 Animal information storage
260 Display data storage
270 Habit information storage
280 Image storage
290 Feature quantity storage

The invention claimed is:

1. A position information transmission device comprising:
an acquirer configured to acquire position information of a communicator or an animal and identification information for identifying the communicator or the animal from the communicator attached to each of a plurality of animals within a facility; and
a transmitter configured to transmit the position information to a display with respect to the animal whose position information satisfies a criterion,
wherein the transmitter transmits the position information to the display when a position indicated in the position information is within an exhibition area of the animal corresponding to the identification information received together with the position information.

2. The position information transmission device according to claim 1, wherein the transmitter transmits abnormality information about the animal corresponding to the position information to a terminal used by a staff member of the facility when the position information has not changed for a reference time period or longer.

3. The position information transmission device according to claim 2, wherein the transmitter transmits the abnormality information to the terminal together with the position information.

4. The position information transmission device according to claim 1,
wherein the display device is a terminal owned by a visitor to the facility, and
wherein the transmitter
receives designation information for designating the animal from the terminal and
transmits the position information to the display when the position information of the animal indicated in the designation information satisfies the criterion.

5. The position information transmission device according to claim 1, wherein the transmitter transmits a notification indicating that the criterion is not satisfied to the display with respect to the animal whose position information does not satisfy the criterion.

6. The position information transmission device according to claim 1,
wherein the acquirer further includes a processor configured to acquire state information indicating a state of the animal generated by a sensor and process the state information, and
wherein the transmitter further transmits a processing result of the processor to the display.

7. The position information transmission device according to claim 5, wherein the transmitter reads habit information corresponding to the identification information acquired by the acquirer from a habit information storage storing the habit information that is a result of statistical processing of the state information for each animal and transmits the read habit information to the display.

8. The position information transmission device according to claim 5,
wherein the sensor is attached to the animal, and
wherein the acquirer acquires the state information from the communicator.

9. The position information transmission device according to claim 5, wherein the sensor is an imager configured to generate an image of the animal.

10. A position information transmission method comprising:
acquiring, by a computer, position information of a communicator or an animal and identification information for identifying the communicator or the animal from the communicator attached to each of a plurality of animals within a facility; and
transmitting, by the computer, the position information to a display with respect to the animal whose position information satisfies a criterion,
wherein the position information is transmitted to the display when a position indicated in the position information is within an exhibition area of the animal corresponding to the identification information received together with the position information.

11. A position information transmission device comprising:
an acquirer configured to acquire position information of a communicator or an animal and identification information for identifying the communicator or the animal from the communicator attached to each of a plurality of animals within a facility; and
a transmitter configured to transmit the position information to a display with respect to the animal whose position information satisfies a criterion, wherein the transmitter transmits a notification indicating that the criterion is not satisfied to the display with respect to the animal whose position information does not satisfy the criterion, and wherein the transmitter reads habit information corresponding to the identification information acquired by the acquirer from a habit information storage storing the habit information that is a result of statistical processing of the state information for each animal and transmits the read habit information to the display.

* * * * *